(12) United States Patent
Sugaya et al.

(10) Patent No.: US 7,081,484 B2
(45) Date of Patent: Jul. 25, 2006

(54) ANION EXCHANGE MEMBRANE, PROCESS FOR ITS PRODUCTION AND SOLUTION TREATING APPARATUS

(75) Inventors: Yoshio Sugaya, Kanagawa (JP); Hiroshi Toda, Chiba (JP); Yukio Matsumura, Chiba (JP); Hirohisa Kubota, Fukuoka (JP)

(73) Assignee: Asahi Glass Company, Limited, Tokyo (JP)

( * ) Notice: Subject to any disclaimer, the term of this patent is extended or adjusted under 35 U.S.C. 154(b) by 821 days.

(21) Appl. No.: 09/909,898

(22) Filed: Jul. 23, 2001

(65) Prior Publication Data

US 2002/0019448 A1    Feb. 14, 2002

(30) Foreign Application Priority Data

Jul. 24, 2000    (JP) ............................. 2000-221865

(51) Int. Cl.
C08J 5/20    (2006.01)
(52) U.S. Cl. .......................................... 521/27; 521/32
(58) Field of Classification Search ................ 521/27, 521/32
See application file for complete search history.

(56) References Cited

U.S. PATENT DOCUMENTS 3,846,521 A * 11/1974 Osterholtz .................... 264/22
4,169,023 A *  9/1979 Sata ............................. 204/98
4,775,474 A * 10/1988 Chau ...................... 210/500.34
4,876,129 A * 10/1989 Akao .......................... 428/359
5,045,171 A *  9/1991 MacDonald ................ 204/296
5,350,523 A *  9/1994 Tomoi ......................... 210/683
5,518,627 A *  5/1996 Tomoi ......................... 210/682
5,759,373 A *  6/1998 Terada ........................ 204/524
6,306,646 B1 * 10/2001 Saad ........................ 435/305.1

* cited by examiner

Primary Examiner—Bernard Lipman
(74) Attorney, Agent, or Firm—Oblon, Spivak, McClelland, Maier & Neustadt, P.C.

(57) ABSTRACT

An anion exchange membrane comprising a resin phase which contains from 20 to 96 mass % of a polymer having repeating units represented by the following formula (1):

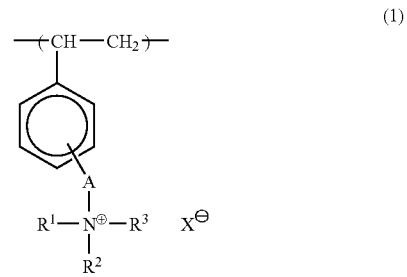

wherein A is a $C_{3-8}$ alkylene group or an alkyleneoxyalkyl group having a total carbon number of from 4 to 9, each of $R^1$, $R^2$ and $R^3$ is a hydrogen atom, a $C_{1-6}$ alkyl group or a hydroxyalkyl group, and $X^-$ is an anion, and wherein any hydrogen atom bonded to the benzene ring may be substituted by an alkyl group or a halogen atom, and from 4 to 80 mass % of a thermoplastic polymer having no ion exchange groups, substantially uniformly.

20 Claims, No Drawings

ANION EXCHANGE MEMBRANE, PROCESS FOR ITS PRODUCTION AND SOLUTION TREATING APPARATUS

The present invention relates to an anion exchange membrane, a process for its production and a solution treating apparatus.

Anion exchange membranes are reported in many literatures and patents. However, the most practical and useful one may be an anion exchange membrane having anion exchange groups introduced into a vinylpyridine/divinylbenzene copolymer or a styrene/divinylbenzene copolymer having chloromethyl groups on its aromatic rings. In addition to its chemical resistance and thermal resistance, such a membrane has a feature that the ion exchange characteristics or the selective permeability can be controlled by changing the content of the divinylbenzene as a crosslinking agent. Accordingly, various types have been synthesized and developed for various applications. Especially in the field of electrodialytic concentration of sea water for salt production, a membrane has been developed which has a low electric resistance and a high transport number and which has a high level of function to selectively permeate monovalent ions.

However, such an ion exchange membrane made from a vinylpyridine/divinylbenzene copolymer or a styrene/divinylbenzene copolymer has a drawback that it is difficult to control the heat generation or dimensional change during the polymerization or the reaction to introduce ion exchange groups, whereby the yield tends to be poor. Further, it is constituted by a styrene type resin which is mechanically relatively brittle, whereby during a high temperature use or depending upon the components in the water to be treated, the membrane is likely to excessively swell, thus leading to a problem in durability such as deterioration of the membrane strength or the selective ion permeability.

Especially in a solution having a high pH, as the temperature increases, anion exchange groups will be decomposed with increasing speed, thus leading to an increase of the membrane electric resistance or deterioration of the selective permeability of ions. Accordingly, there have been restrictions with respect to the conditions of its use, such that it has been required to lower the alkali concentration or to lower the temperature for use.

On the other hand, with respect to an anion exchange resin having good durability, JP-A-4-334491, JP-A-7-289921, etc., have proposed an anion exchange resin having certain specific substituents A introduced between benzene rings and anion exchange groups. However, nothing is known with respect to the durability and the characteristics such as selective permeability of anions of an ion exchange membrane having such anion exchange groups or with respect to a novel application method employing it.

It is an object of the present invention to obtain an anion exchange membrane excellent in durability and selective permeability of anions and to provide a novel application method employing such a membrane.

The present invention provides an anion exchange membrane comprising a resin phase which contains from 20 to 96 mass % of a polymer having repeating units represented by the following formula (1):

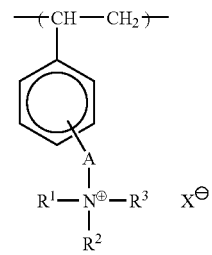

wherein A is a $C_{3-8}$ alkylene group or an alkyleneoxyalkyl group having a total carbon number of from 4 to 9, each of $R^1$, $R^2$ and $R^3$ is a hydrogen atom, a $C_{1-6}$ alkyl group or a hydroxyalkyl group, and $X^-$ is an anion, and wherein any hydrogen atom bonded to the benzene ring may be substituted by an alkyl group or a halogen atom, and from 4 to 80 mass % of a thermoplastic polymer having no ion exchange groups, substantially uniformly.

The present invention also provides a process for producing an anion exchange membrane, which comprises mixing a thermoplastic polymer having no ion exchange groups with a polymerizable component comprising a monomer of the formula (2):

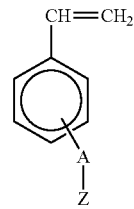

wherein A is a $C_{3-8}$ alkylene group or an alkyleneoxyalkyl group having a total carbon number of from 4 to 9, and Z is chlorine, bromine, iodine, a hydroxyl group, a tosyl group, a primary to tertiary amine, or a $-NR^1R^2R^3$ group, wherein each of $R^1$, $R^2$ and $R^3$ is a hydrogen atom, a $C_{1-6}$ alkyl group or a hydroxyl group, and wherein any hydrogen atom bonded to the benzene ring may be substituted by an alkyl group or a halogen atom, or a mixture of the monomer of the formula (2) and a monomer copolymerizable therewith, and then polymerizing the polymerizable component.

Now, the present invention will be described in detail with respect to the preferred embodiments.

The anion exchange membrane of the present invention comprises a membrane-form resin phase wherein from 20 to 96 mass % of a polymer having repeating units represented by the above formula (1) (hereinafter referred to simply as a polymer of the formula (1)) and from 4 to 80 mass % of a thermoplastic polymer having no ion exchange groups are mixed substantially uniformly. In the present invention, "mixed substantially uniformly" means that when the resin phase is observed by an optical microscope, the polymer of the formula (1) and the thermoplastic polymer having no ion exchange groups can not be distinguished, and phase separated structure containing phases having a size of more than 1 μm can not be observed.

For example, a heterogeneously mixed ion exchange membrane obtained by mechanically mixing a powder of the polymer of the formula (1) and the thermoplastic polymer and forming the mixture into a membrane form by e.g. hot pressing, is not desirable, since deterioration of the selective permeability of ions due to an increase of the concentration of the electrolyte is thereby substantial, and if it is used for a long period of time at a high temperature or in a solution having a composition which swells the resin, deterioration of the selective permeability of ions or deterioration of the membrane strength is likely to be brought about. Further, if the polymer of the formula (1) is less than 20 mass %, the electric resistance of the membrane tends to increase, or the selective permeability of ions tends to deteriorate, and if it exceeds 96 mass %, the strength of the resin phase tends to be inadequate, or the durability in use tends to be poor. It is more preferred that in the resin phase, the polymer of the formula (1) is from 40 to 94 mass %.

A in the formula (1) is a $C_{3-8}$ alkylene group or an alkyleneoxyalkyl group having a total carbon number of from 4 to 9. Here, an alkyleneoxyalkyl group is an alkylene group containing an oxygen atom of an ether bond. The alkylene group may be straight chain or branched. In the case of a $C_1$ or $_2$ alkylene group, the ammonium group having a positive charge is susceptible to an influence of the benzene ring through the alkylene group, whereby the anion exchange groups are poor in the heat resistance. On the other hand, if the carbon number is 9 or more, the ion exchange capacity per mass decreases, and consequently, the electric resistance of the membrane tends to increase, or the selective permeability of ions tends to deteriorate.

Also in the case of a group containing an oxygen atom of an ether bond, if the carbon number departs from the above range, the consequence is the same as in the case of the alkylene group. Specifically, —$(CH_2)_n$—, wherein n is an integer of from 1 to 6, —$(CH_2)_4$—O—$CH_2$— (one having the tetramethylene group side bonded to nitrogen) or —$(CH_2)_5$—O—$CH_2$— (one having the pentamethylene group side bonded to nitrogen) may be mentioned.

Each of $R^1$, $R^2$ and $R^3$ is a hydrogen atom, a $C_{1-6}$ alkyl group or a hydroxyalkyl group. They may be the same or different from one another. As such an alkyl group or a hydroxyalkyl group, a methyl group, an ethyl group, a propyl group, a butyl group, a hydroxyethyl group or a hydroxypropyl group is preferably employed.

$X^-$ is an anion which is a counter anion coordinated with the ammonium group. Specifically, it may, for example, be a halogen ion such as $Cl^-$, $Br^-$ or $I^-$, $HCO_3^-$, $CO_3^{2-}$, an acetic ion, $NO_3^-$, $OH^-$ or a p-toluene sulfonic ion. Here, $X^-$ may be a polyvalent anion such as $SO_4^{2-}$, and in such a case, $X^-$ represents a polyvalent anion corresponding to monovalent.

Any hydrogen atom bonded to the benzene ring of the formula (1) may be substituted by an alkyl group or a halogen atom. As the alkyl group, a methyl group or an ethyl group is preferred, and as the halogen atom, chlorine or bromine is preferred.

Further, the polymer of the formula (1) may have other repeating units. For example, it may have repeating units containing ion exchange groups other than the ion exchange groups contained in the repeating units represented by the formula (1), such as repeating units based on vinylpyridine or chloromethylstyrene. In such a case, it is preferred from the viewpoint of the heat resistance or the durability that at least 90 mol % of all ion exchange groups are ion exchange groups contained in the repeating units represented by the formula (1). Further, as repeating units which do not contribute to crosslinking or ion exchange, those based on styrene, vinyltoluene, ethylene, propylene or acrylonitrile, may be contained.

As a process for producing the above-mentioned preferred resin phase, a process is preferred in which from 25 to 2,500 parts by mass of the monomer of the formula (2) is uniformly mixed with 100 parts by mass of the thermoplastic polymer having no ion exchange groups, and then the monomer is polymerized.

In the monomer of the formula (2), A is the same as the one in the formula (1). However, when Z is a primary to tertiary amine or a —$NR^1R^2R^3$ group, the monomer will be hydrophilic, whereby uniform mixing tends to be difficult when copolymerized with another polymer or when mixed to the thermoplastic polymer having no ion exchange groups. Accordingly, for example, by immersing a polyethylene film or a polypropylene film irradiated with electron rays or γ-rays in an aqueous solution of the above polymer, the monomer is dissolved in the thermoplastic polymer and polymerized, whereby it is possible to obtain an anion exchange membrane comprising a resin layer of a uniform mixture of the polymer of the formula (1) and the thermoplastic polymer. Here, "dissolved" means that the monomer is penetrated into the thermoplastic polymer by diffusion.

On the other hand, in a case where in the monomer of the formula (2), Z is chlorine, bromine, iodine, a hydroxyl group or a tosyl group, it is necessary that after the polymerization, it is reacted with ammonia or with a primary to tertiary amine to convert it to a primary to tertiary amino group or a quaternary ammonium group. Such a monomer is preferably employed, since modification by copolymerization with other monomers is easy and mixing or dissolving in the thermoplastic polymer is good. A monomer wherein Z is bromine, is preferably employed particularly from the viewpoint of the stability, polymerizability, and changeability to anion exchange groups, of the monomer.

Further, by copolymerizing the monomer of the formula (2) with other monomer, the ion selectivity and the mechanical strength can be controlled to a desired level. In such a case, such other monomer is preferably a monomer containing a hydrocarbon group having an unsaturated bond. Specifically, it may be one having at least two vinyl groups such as divinylbenzene, trivinylbenzene, divinyltoluene, divinylnaphthalene or ethylene glycol dimethacrylate. Further, as a monomer which does not contribute to crosslinking or ion exchange, styrene, vinyltoluene, ethylene, propylene or acrylonitrile may, for example, be employed.

The thermoplastic polymer constituting the resin phase of the anion exchange membrane is preferably a thermoplastic polymer which has an unsaturated bond ratio in its main chain of at most 3% and which dissolves at least 25 parts by mass of the monomer of the formula (2) per 100 parts by mass of the thermoplastic polymer. Here, the unsaturated bond ratio in the main chain is one having the number of double bonds and triple bonds among the total number of bonds of carbon atoms constituting the main chain represented by percentage. For example, with a polybutadiene polymer, the unsaturated bond ratio is 25.0%, and with the copolymer of styrene/butadiene in a mass ratio of 1:1, the unsaturated bond ratio is 16.7%. Thus, they are not suitable for the thermoplastic polymer of the present invention.

If the unsaturated bond ratio in the main chain exceeds 3%, even if the initial performance of the obtainable anion exchange membrane is good, the unsaturated bonds are likely to be broken during use for a long period of time, whereby long term durability of the heat resistance or chemical resistance tends to deteriorate, such being undesirable.

As the thermoplastic polymer which has an unsaturated bond ratio of at most 3% and which dissolves at least 25 parts by mass of the monomer of the formula (2) per 100 parts by mass of the thermoplastic polymer, a thermoplastic olefin, a thermoplastic elastomer or a thermoplastic plastomer, may, for example, be preferred. Specifically, polyvinyl chloride, chlorinated polyvinyl chloride, a copolymer of ethylene with vinyl chloride, polyethylene, chlorinated polyethylene, chlorosulfonated polyethylene, a styrene type thermoplastic elastomer, a copolymer of hydrogenated styrene with butadiene, a hydrogenated nitrile rubber, a hydrogenated pyridine rubber, or a mixture thereof, may, for example, be mentioned.

Here, the styrene type thermoplastic elastomer is a copolymer having hard segments made of polystyrene and soft segments. The soft segments may preferably be those made of polybutadiene, polyisoprene, poly(ethylene/butylene) (ethylene/butylene alternating copolymer, same applies hereinafter) or poly(ethylene/propylene). Such a styrene type thermoplastic elastomer may, for example, be preferably a polystyrene/hydrogenated polybutadiene/polystyrene block polymer (H-SBS), a polystyrene/(polyethylene/butylene rubber)/polystyrene block polymer (SEBS), a polystyrene/hydrogenated polyisoprene rubber/polystyrene block polymer (H-SIS), a polystyrene/(polyethylene/propylene rubber)/polystyrene block polymer (SEPS), a polystyrene/polyethylene/(polyethylene/propylene rubber)/polystyrene block polymer (SEEPS) or a polystyrene/(vinyl polyisoprene(polyisopropenylethylene))/polystyrene block polymer, since such an elastomer has a good compatibility with the monomer of the formula (2).

In the process for producing an anion exchange membrane of the present invention, at least 25 parts by mass of the monomer of the formula (2) is uniformly mixed to 100 parts by mass of the thermoplastic polymer having no ion exchange groups, followed by polymerization to obtain a membrane-form resin phase. In a case where the size in use is small or in a case of an application where mechanical strength or dimensional stability is not required, an anion exchange membrane made solely of the resin phase obtained by polymerization, can be used. In such a case, it is preferred to dissolve and polymerize from 25 to 2,500 parts by mass, preferably from 50 to 500 parts by mass, particularly preferably from 70 to 200 parts by mass, of the monomer of the formula (2) to 100 parts by mass of the thermoplastic polymer. Particularly, a process of impregnating a polymerizable component comprising the monomer to a membrane-form molded product of the thermoplastic polymer having no ion exchange groups and then polymerizing the polymerizable component, is preferred from the viewpoint of the mass productivity.

On the other hand, in a case where the size of the membrane to be used is large or in a case of an application where mechanical strength or dimensional stability is required, it is preferable to use an anion exchange membrane having the resin phase obtainable by polymerization reinforced with a porous membrane-supporting material. The reinforcing method may be a method wherein the monomer is dissolved in a composite membrane having a porous membrane-supporting material such as cloth or a non-woven fabric having a smaller solubility with the monomer than the thermoplastic polymer, preliminarily embedded to the thermoplastic polymer by e.g. hot pressing, and then polymerized. Further, as another preferred method for reinforcing the membrane, a method may be employed wherein the thermoplastic polymer is mixed with a polymerizable component comprising the monomer of the formula (2) or a mixture comprising the monomer of the formula (2) and other monomer copolymerizable therewith, then, the obtained viscous solution is impregnated to a porous membrane-supporting material, and then the above polymerizable component is polymerized. Here, it is preferred to add from 25 to 2,500 parts by mass, preferably from 100 to 2,000 parts by mass, particularly preferably from 200 to 1,500 parts by mass, of the monomer per 100 parts by mass of the thermoplastic polymer, although it may vary depending upon the construction and the molecular weight of the thermoplastic polymer.

As the porous membrane-supporting material to be used for the reinforced anion exchange membrane of the present invention, a woven fabric, a non-woven fabric or a finely porous membrane of polyvinyl chloride or polyvinylidene chloride may be used, but from the viewpoint of the long term durability at a high temperature or in a high pH solution, it is preferred to employ a woven fabric or a finely porous membrane made of polyethylene, polypropylene or fluorinated olefin.

When such a porous membrane-supporting material is used, it is preferred that the membrane-supporting material is irradiated with electron rays or γ-rays prior to being contacted with the monomer having the formula (2), or the membrane-supporting material impregnated with the monomer is irradiated with electron rays or γ-rays to secure the adhesion between the porous substrate and the membrane, from the viewpoint of the electrical resistance, mechanical strength and long term durability of the obtainable reinforced membrane. Further, for the same purpose, it is preferred to apply chemical treatment such as sulfonation or halogenation preliminarily to the porous substrate.

In the reinforced anion exchange membrane, it is preferred that the polymer of the formula (1) is present also in the porous membrane-supporting material. For example, in the case where a cloth is used for reinforcement, it is preferred that the polymer of the formula (1) is present, as penetrated, also in the interior of the fibers constituting the cloth. At that time, the content of the repeating units represented by the formula (1) in the porous membrane-supporting material is preferably from 0.05 to 0.7 times the content of such repeating units in the resin phase, as compared by the intensities of the fluorescent X-rays attributable to X of the formula (1). Such a state can be observed by carrying out a scanning electron microscope-fluorescent X-ray (SEM-EDAX) analysis with respect to the cross-section of the reinforced anion exchange membrane to obtain the intensity of the element contained in X of the formula (1). By the observation, it is preferred that the ratio of the intensity at the supporting-material portion to the intensity of the resin phase portion is from 0.05 to 0.7. If the intensity ratio is less than 0.05, the electric resistance of the membrane tends to be high, and the long term durability tends to be low, and if it exceeds 0.7, the mechanical strength tends to be low. It is more preferably from 0.1 to 0.6. Such a preferred ratio of the intensity can be attained by selecting the polymerization conditions or the irradiation level of electron rays or γ-rays.

In a case where Z of the formula (2) is a halogen atom, in the same manner as for the chloromethylstyrene type polymer membrane, the polymer membrane thus obtained may be reacted, for example, with an ammonia, methyl amine or dimethyl amine to obtain a weakly basic anion exchange membrane, may be reacted with e.g. triethyl amine, dimethylethanol amine, methyl diethanol amine or triethanol amine to obtain a strongly basic anion exchange membrane, or may be reacted with e.g. ethylene diamine or tetramethyl diaminopropane to obtain an anion exchange membrane having ion exchange groups bonded to one another.

The ion exchange capacity of the resin phase of the anion exchange membrane of the present invention obtainable by the above process varies depending upon the application purpose, but in the case where the counter ion is Cl, the ion exchange capacity is preferably from 0.5 to 4 meq/g dry resin. Hereinafter, in this specification, the ion exchange capacity is represented by the value where the counter ion is Cl. If the ion exchange capacity is smaller than this range, the electric resistance of the anion exchange membrane tends to be high, and if it is larger than this range, the mechanical strength of the membrane or the long term durability tends to be low.

The anion exchange membrane of the present invention can be used for an electrodialytic process for the purpose of concentration of sea water, demineralization of brine water, concentration or recovery of an acid, or recovery of valuable metals, and for a diffusion dialytic process for the purpose of e.g. recovery of an acid. Further, it is useful also for a separator of a fuel cell or a secondary battery. Particularly, as it is excellent in the alkali resistance or heat resistance, it is useful for a solution treating apparatus for concentration, demineralizing and purifying hydroxide from a solution having a pH of 10 or higher by electrodialysis or diffusion dialysis, for a solution-treating apparatus which requires high temperature sterilization or for a self regenerating type demineralizing water production apparatus. Further, it is preferred as an anion base membrane for a composite membrane with a cation exchange membrane (so-called bipolar membrane).

Now, the present invention will be described in further detail with reference to Examples (Example 1 and 4 to 7) and Comparative Examples (Examples 2 and 3). However, it should be understood that the present invention is by no means restricted by such specific Examples.

EXAMPLE 1

As the monomer of the formula (2), 4-(4-bromobutyl) styrene (colorless transparent solution, boiling point: 115° C./0.2 mmHg) wherein A is a tetramethylene group and Z is bromine, was used. A monomer mixture comprising 45 mass % of this monomer, 35 mass % of styrene and 20 mass % of divinylbenzene (purity: 57 mass %, the rest being ethylbenzene) was obtained. To 100 parts by mass of this monomer mixture, 15 parts by mass of a styrene type thermoplastic elastomer (Claton 1730, tradename, manufactured by Shell Japan Ltd., unsaturated bond ratio: 0%) having polystyrene as hard segments and poly(ethylene/propylene) as soft segments, as the thermoplastic polymer and 4 parts by mass of benzoyl peroxide (Niper BO, tradename, manufactured by Nippon Oil and Fat Co. Ltd.) as a polymerization initiator, were mixed to obtain a viscous liquid of 1,500 cps.

Then, the above viscous liquid was impregnated to a membrane-supporting material made of a polypropylene cloth having a thickness of 300 μm and a basis weight of 100 g/m$^2$ and irradiated with γ-rays of 300 kGy, and then the monomer mixture was polymerized, followed by molding into a membrane having a thickness of 320 μm. This membrane-form molded product was immersed in a 1 mol/l trimethyl amine methanol solution at 40° C. for 16 hours to convert Z of the repeating units based on the monomer of the formula (2) to a quaternary ammonium salt type, which was further exchanged to a Cl type. Thus, an anion exchange membrane comprising a resin phase having a structural unit of the formula (1) (wherein A is a tetramethylene group, each of $R^1$, $R^2$ and $R^3$ is a methyl group, and $X^-$ is $Cl^-$) was obtained.

The anion exchange membrane thus obtained had an ion exchange capacity of 1.8 meq/g dry resin. The resistivity of the membrane was measured in a 0.5 mol/l sodium chloride aqueous solution at an alternating current of 1,000 Hz and found to be 600 Ω·cm. The static transport number was measured at 25° C. with (0.5 mol/l sodium chloride aqueous solution/1.0 mol/l sodium chloride aqueous solution) and found to be 0.97. The anion exchange membrane was dried, and with respect to its cross-section, the intensity of the Cl element at the portion of the propylene fiber of the cloth against the intensity of the Cl element of the resin phase was obtained by the SEM-EDAX measurement, whereby the intensity ratio was 0.4. The resistivity, the static transport number, and the intensity ratio of the Cl element were measured in the same manner also in the following Examples.

This anion exchange membrane was immersed in a 0.1 mol/l sodium hydroxide aqueous solution to convert the anion exchange groups to OH type, and after removing excess sodium hydroxide by washing with water, the membrane was immersed in deionized water at 80° C. for 6 months. After the immersion, the anion exchange membrane had an ion exchange capacity of 1.76 meq/g dry resin, a resistivity of 630 Ω·cm and a static transport number of 0.97.

EXAMPLE 2 (COMPARATIVE EXAMPLE)

An anion exchange membrane was obtained in the same manner as in Example 1 except that the styrene type thermoplastic elastomer in Example 1 was not used.

With this anion exchange membrane, changes in the property were observed such that the resistivity was from 400 to 500 Ω·cm, and the static transport number was from 0.90 to 0.97. The intensity ratio of the Cl element at the cloth portion to the resin phase by SEM-EDAX was 0.4. This anion exchange membrane was converted to OH type in the same manner as in Example 1 and immersed in deionized water at 80° C. for 6 months. After the immersion, cracking was observed in the resin phase. After the immersion, the static transport number of the anion exchange membrane was 0.88.

EXAMPLE 3 (COMPARATIVE EXAMPLE)

An anion exchange membrane was obtained in the same manner as in Example 1 except that chloromethylstyrene (45 mass % in the monomer mixture) was used instead of 45 mass % of 4-(4-bromobutyl)styrene in Example 1.

This anion exchange membrane had an ion exchange capacity of 1.9 meq/g dry resin, a resistivity of 500 Ω·cm and a static transport number of 0.97. Further, the intensity ratio of the Cl element at the cloth portion to the resin phase by SEM-EDAX was 0.4. This anion exchange membrane was converted to OH type in the same manner as in Example 1 and immersed in deionized water at 80° C. for 6 months. After the immersion, the membrane had an ion exchange capacity of 1.5 meq/g dry resin, a resistivity of 1,000 Ω·cm and a static transport number of 0.92.

EXAMPLE 4

An anion exchange membrane was obtained in the same manner as in Example 1 except that a polyethylene cloth having a thickness of 260 μm and a basis weight of 70 g/m and irradiated with γ-rays of 300 kGy was used instead of the polypropylene cloth in Example 1, and 10 parts by mass of hydrogenated nitrile rubber (Z Pole 2000, tradename, manufactured by Nippon Zeon Corporation) was used instead of 15 parts by mass of the styrene type thermoplastic elastomer.

This anion exchange membrane had a resistivity of 500 Ω·cm and a static transport number of 0.97. Further, the intensity ratio of the Cl element at the cloth portion to the resin phase by SEM-EDAX was 0.35. This anion exchange membrane was converted to OH type in the same manner as in Example 1 and immersed in deionized water at 80° C. for 6 months. After the immersion, the membrane had a resistivity of 550 Ω·cm and a static transport number of 0.97.

EXAMPLE 5

An anion exchange membrane was obtained in the same manner as in Example 4 except that a polyvinyl chloride cloth having a thickness of 160 μm and a basis weight of 80 g/m² was used instead of the polyethylene cloth in Example 4.

This anion exchange membrane had a resistivity of 400 Ω·cm and a static transport number of 0.98. The anion exchange groups of this anion exchange membrane were converted to $SO_4$ type, whereupon the intensity ratio of the S element at the cloth portion to the resin phase by SEM-EDAX was obtained and found to be 0.6. This anion exchange membrane was converted to OH type in the same manner as in Example 1 and immersed in deionized water at 80° C. for 6 months. After the immersion, the membrane had a resistivity of 650 Ω·cm and a static transport number of 0.97.

EXAMPLE 6

A polyethylene film having a thickness of 50 μm and irradiated with γ-rays of 300 kGy was immersed in a mixed liquid comprising 100 parts by mass of 4-(4-bromobutyl) styrene and 1 part by mass of an initiator benzoyl peroxide (Niper BO, tradename, manufactured by Nippon Oil and Fat Co. Ltd.) to let the monomer penetrate into the polyethylene film and at the same time to let it polymerize.

The membrane thus obtained contained 50 parts by mass of a polymer of 4-(4-bromobutyl)styrene per 100 parts by mass of polyethylene. This membrane was subjected to amination with trimethylamine in the same manner as in Example 1 to obtain an anion exchange membrane. This anion exchange membrane had an ion exchange capacity of 1.3 meq/g, a resistivity of 200 Ω·cm and a static transport number of 0.98.

EXAMPLE 7

An anion exchange membrane was obtained in the same manner as in Example 4 except that as the membrane-supporting material, a polyethylene cloth having a thickness of 260 μm and a basis weight of 70 g/m² and irradiated with γ-rays of 300 kGy, was used, and 18 parts by mass of a styrene/vinyltriisoprene copolymer (Hybler 2751, tradename, Kuraray Co., Ltd.) was used instead of 10 parts by mass of the hydrogenated nitrile rubber.

This anion exchange membrane had a resistivity of 370 Ω·cm and a static transport number of 0.98. Further, the intensity ratio of the Cl element at the cloth portion to the resin phase by SEM-EDAX was 0.20. This anion exchange membrane was converted to OH ion type in the same manner as in Example 1 and immersed in deionized water at 80° C. for 6 months. After the immersion, the membrane had a resistivity of 420 Ω·cm and a static transport number of 0.97.

The anion exchange membrane of the present invention is excellent in the alkali resistance and the heat resistance and has high mechanical strength. Thus, it is useful for an application in which a conventional anion exchange membrane had a problem in the durability.

What is claimed is:

1. An anion exchange membrane comprising a resin phase which contains from 20 to 96 mass % of a polymer having repeating units represented by the following formula (1):

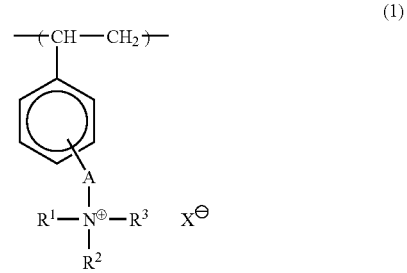

wherein A is a $C_{3-8}$ alkylene group or an alkyleneoxyalkyl group having a total carbon number of from 4 to 9, each of $R^1$, $R^2$ and $R^3$ is a hydrogen atom, a $C_{1-6}$ alkyl group or a hydroxyalkyl group, and $X^-$ is an anion, and wherein any hydrogen atom bonded to the benzene ring may be substituted by an alkyl group or a halogen atom, and from 4 to 80 mass % of a thermoplastic polymer having no ion exchange groups, mixed substantially uniformly.

2. The anion exchange membrane according to claim 1, wherein the thermoplastic polymer having no ion exchange groups is a thermoplastic polymer having an unsaturated bond ratio in its main chain of at most 3%.

3. The anion exchange membrane according to claim 1, which comprises the resin phase and a porous membrane-supporting material.

4. The anion exchange membrane according to claim 3, wherein the polymer having repeating units represented by the formula (1) is penetrated in the porous membrane-supporting material, and the content of the repeating units represented by the formula (1) in the membrane-supporting material is from 0.05 to 0.7 time the content of such repeating units in the resin phase.

5. A process for producing an anion exchange membrane, which comprises:

mixing a thermoplastic polymer having no ion exchange groups with a polymerizable component comprising a monomer of the formula (2):

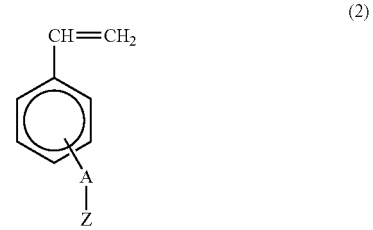

wherein A is a $C_{3-8}$ alkylene group or an alkyleneoxyalkyl group having a total carbon number of from 4 to 9, and Z is chlorine, bromine, iodine, a hydroxyl group, a tosyl group, a primary to tertiary amine, or a —$NR^1R^2R^3$ group, wherein each of $R^1$, $R^2$ and $R^3$ is a hydrogen atom, a $C_{1-6}$ alkyl group or a hydroxyl group, and wherein any hydrogen atom bonded to the benzene ring may be substituted by an alkyl group or a halogen atom, or a mixture of the monomer of the formula (2) and a monomer copolymerizable therewith, and then polymerizing the polymerizable component, wherein process is carried out in the following order:
(i) mixing the thermoplastic polymer with the polymerizable component of formula (2), then
(ii) polymerizing the polymerizable component, then
(iii) converting Z to an ammonium salt.

6. The process for producing an anion exchange membrane according to claim 5, wherein the monomer of the formula (2) is used in an amount of from 20 to 96 mass %, based on the total amount of the polymerizable component and the thermoplastic polymer having no ion exchange groups.

7. The process for producing an anion exchange membrane according to claim 5, wherein the thermoplastic polymer is mixed with the polymerizable component by impregnating the polymerizable component to the membrane-form molded product of the thermoplastic polymer having no ion exchange groups.

8. The process for producing an anion exchange membrane according to claim 5, wherein a solution obtained by mixing the thermoplastic polymer having no ion exchange groups with the polymerizable component, is formed into a membrane, and then, the polymerizable component is polymerized.

9. The process for producing an anion exchange membrane according to claim 8, wherein the solution obtained by mixing the thermoplastic polymer having no ion exchange groups with the polymerizable component, is impregnated to a porous membrane-supporting material and formed into a membrane, and then, the polymerizable component is polymerized.

10. The process for producing an anion exchange membrane according to claim 9, wherein the porous membrane-supporting material is irradiated with electron rays or γ-rays before or when the solution obtained by mixing the thermoplastic polymer having no ion exchange groups with the polymerizable component, is impregnated thereto.

11. A solution treating apparatus comprising an electrodialytic mechanism employing the anion exchange membrane as defined in claim 1.

12. A solution treating apparatus comprising a diffusion dialytic mechanism employing the anion exchange membrane as defined in claim 1.

13. The anion exchange membrane according to claim 1, wherein the thermoplastic polymer consists of polymerized monomer units that do not contribute to cross-linking.

14. The anion exchange membrane according to claim 1, wherein the thermoplastic polymer does not have any ion exchange groups.

15. The anion exchange membrane according to claim 1, wherein the polymer having repeating units of the monomer represented by formula (1) is obtained from a polymer consisting of 4-(4-bromobutyl)styrene, styrene, and divinylbenzene, and the thermoplastic polymer consists of polymerized monomer units that do not contribute to cross-linking.

16. The anion exchange membrane according to claim 1, further comprising at least one of a polypropylene or polyethylene cloth impregnated in the resin phase.

17. The anion exchange membrane according to claim 1, wherein A is an alkylene oxyalkyl group having a total carbon number of from 4 to 9.

18. The process as claimed in claim 5, wherein Z is at least one of chlorine, bromine, and iodine.

19. The anion exchange membrane according to claim 1, wherein the polymer having repeating units of the monomer represented by formula (1) is obtained from a polymer consisting of 4-(4-bromobutyl)styrene, styrene, and divinylbenzene, and the thermoplastic polymer consists of polymerized monomer units that do not contribute to cross-linking, wherein the thermoplastic polymer is present in an amount of 15 parts by mass based on 100 parts by mass of the polymer consisting of 4-(4-bromobutyl)styrene, styrene, and divinylbenzene.

20. The process according to claim 5, wherein the polymerizable component contains only monomers that do not contribute to cross linking, and the thermoplastic polymer consists of polymerized monomer units that do not contribute to cross-linking.

\* \* \* \* \*